United States Patent
Inglese et al.

(10) Patent No.: US 8,404,781 B2
(45) Date of Patent: Mar. 26, 2013

(54) SEMI-CONTINUOUS INTEGRATED PROCESS FOR THE PRODUCTION OF HIGH IMPACT VINYL AROMATIC (CO)POLYMERS BY ANIONIC/RADICAL POLYMERIZATION IN SEQUENCE

(75) Inventors: Riccardo Inglese, Castiglione delle Stiviere (IT); Leonardo Chiezzi, Follonica (IT); Fabio Montanari, Ravenna (IT); Alessandro Casalini, Mantova (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 276 days.

(21) Appl. No.: 12/747,749

(22) PCT Filed: Nov. 28, 2008

(86) PCT No.: PCT/EP2008/010166
§ 371 (c)(1), (2), (4) Date: Aug. 10, 2010

(87) PCT Pub. No.: WO2009/074244
PCT Pub. Date: Jun. 18, 2009

(65) Prior Publication Data
US 2010/0305264 A1    Dec. 2, 2010

(30) Foreign Application Priority Data

Dec. 12, 2007  (IT) .............................. MI2007A2324

(51) Int. Cl.
*C08L 55/00* (2006.01)
(52) U.S. Cl. ........ 525/316; 525/315; 525/902; 525/242; 524/571
(58) Field of Classification Search ................. 525/315, 525/316, 902, 242; 524/571
See application file for complete search history.

(56) References Cited

U.S. PATENT DOCUMENTS

| 4,482,677 A | 11/1984 | Teranaka et al. |
| 6,143,833 A | 11/2000 | Klussmann et al. |
| 6,399,703 B1 | 6/2002 | Fischer et al. |
| 6,471,865 B1 | 10/2002 | Reaves et al. |

FOREIGN PATENT DOCUMENTS

| DE | 198 04 912 | 8/1999 |
| DE | 199 27 131 | 12/1999 |
| EP | 0 046 668 | 3/1982 |
| EP | 1 201 284 | 5/2002 |
| WO | 2005 047353 | 5/2005 |

*Primary Examiner* — Mark Kaucher
(74) *Attorney, Agent, or Firm* — Oblon, Spivak, McClelland, Maier & Neustadt, L.L.P.

(57) ABSTRACT

Butadiene is anionically polymerized (or block copolymerized with styrene) in a low-boiling non-polar solvent in presence of rganolithiura compounds. At the end of the polymerization, the non-polar solvent is switched with styrene and the new solution is stored in tanks in relation to the type of polybutadiene (or its block copolymer with styrene) obtained. The polybutadiene solution (and/or its block copolymer with styrene) with the desired set of properties is then fed to a production plant of high impact vinyl aromatic (co)polymers.

13 Claims, 1 Drawing Sheet

US 8,404,781 B2

SEMI-CONTINUOUS INTEGRATED PROCESS FOR THE PRODUCTION OF HIGH IMPACT VINYL AROMATIC (CO)POLYMERS BY ANIONIC/RADICAL POLYMERIZATION IN SEQUENCE

CROSS-REFERENCE RELATED APPLICATIONS

This application is a National Stage of PCT/EP08/010,166 filed Nov. 28, 2008 and claims the benefit of Italian application MI2007A 002324 filed Dec. 12, 2007.

The present invention relates to a semi-continuous integrated process for the production of high impact vinyl aromatic (co)polymers by means of anionic/radical polymerization in sequence.

More specifically, the present invention relates to a semi-continuous integrated process for the production of high impact polystyrene (HIPS) or acrylonitrile-butadienestyrene (ABS) resins by means of anionic/radical polymerization in sequence.

Even more specifically, the present invention relates to a semi-continuous integrated process for the production of high impact polystyrene (HIPS) or acrylonitrilebutadiene-styrene (ABS) resins by means of anionic/radical polymerization in sequence, starting from butadiene and styrene in the case of HIPS; butadiene, styrene and acrylonitrile in the case of ABS.

The advantages of an integrated process scheme with respect to traditional distinct processes ((1) synthesis and finishing of polybutadiene (or its block copolymer with styrene); (2) dissolution of the polybutadiene (and/or its block copolymer with styrene) in monomers and subsequent radical polymerization) are the following:

a) elimination of the polybutadiene (or its block copolymer with styrene) finishing section relating to the process (1);

b) elimination of the polybutadiene (and/or its block copolymer with styrene) dissolution section, relating to the process (2).

The polybutadiene (and/or its block copolymer with styrene) usually employed in HIPS or ABS production is synthesized starting from butadiene (or butadiene plus styrene) monomer(s) anionically polymerized in a low-boiling non-polar solvent such as, for example, n-hexane, cyclohexane, etc., using organolithium compounds as polymerization initiators.

The anionic polymerization process is carried out batchwise (batch reactors) or in continuous ("CSTR"-type reactors). At the end of the polymerization reaction an about 20% polybutadiene (or its block copolymer with styrene) solution is therefore obtained in a hydrocarbon solvent of the aliphatic or cyclo-aliphatic type. After the addition of a couple of antioxidants, consisting of a primary antioxidant of the phenolic type and a secondary antioxidant, typically an organic compound of trivalent phosphorous, the normal process then provides for the elimination of the solvent which is effected by the combined action of water and vapour in stirred strippers. A suspension of polybutadiene (or its block copolymer with styrene) granules in water is obtained, from which, after dripping on nets, the polybutadiene (or its block copolymer with styrene) is fed to a drying section consisting of two mechanical extruders.

In the first extruder (expeller) most of the water is squeezed out from polybutadiene (or its block copolymer with styrene) and is discharged through side openings of the extruder whereas the complete drying is effected in a second extruder (expander) in which the polybutadiene (or its block copolymer with styrene) subjected to mechanical action is heated to temperatures of 160-180° C. Part of the vapour is eliminated from a vent situated at the end of the extruder, whereas part is eliminated at the outlet of the head. The polybutadiene (or its block copolymer with styrene) granules are then sent with belts or other conveyor methods to a packaging machine where they are shaped into bales.

The nature of polybutadiene (or its block copolymer with styrene) (unsaturated rubber) requires a strict control of the finishing conditions as complications are known to experts in the field, deriving from the formulation of clots of insoluble substances (gels) which are normally formed in the finishing area, in particular in the expander.

These gels cause a lowering in the quality of the polybutadiene (and/or its block copolymer with styrene) for the modification of plastic materials due to the formation of significant surface defects. Great attention is therefore required for defining the finishing conditions of the polybutadiene (or its block copolymer with styrene) with the consequent necessity of effecting numerous analyses for controlling the process and product.

In HIPS or ABS production schemes the following operations are traditionally performed: the polybutadiene (and/or its block copolymer with styrene) is dissolved in styrene monomer at a suitable concentration (generally between 1 and 25%, according to the final product). The polybutadiene (and/or its block copolymer with styrene) dissolution is then diluted with an inert solvent (ethylbenzene for example) and acrylonitrile (if ABS is to be produced). The solution obtained subsequently undergoes peroxide initiated continuous mass radical polymerization in order to obtain the desired HIPS or ABS.

European Patent application EP 334,715 describes the anionic polymerization of butadiene in ethylbenzene as solvent (instead the usually low boiling non polar solvent such as n-hexane and/or cyclohexane) initiated by organolithium compounds. In this specific Patent the process scheme doesn't provide for the switch section of the solvent because the ethylbenzene is usually used in the production of HIPS or ABS. The solution of polybutadiene in ethylbenzene is then diluted with styrene (and eventually acrilonitrile) and (co)polymerized by peroxide initiated continuous mass radical polymerization in order to obtain the desired HIPS or ABS.

International patent application WO 98/22518 describes the synthesis of HIPS/ABS with a continuous process starting from butadiene. The polybutadiene is anionically synthesized in reactors of the "plug-flow" type starting from butadiene, initiated by organolithium compounds. The solvent used in the synthesis of polybutadiene is an aliphatic solvent with a boiling point lower than 130° C., for example hexane. In particular, WO 98/22518 describes the synthesis of both polybutadiene homopolymer and its copolymers with styrene (PBu-PS). The polybutadiene solution in a low-boiling aliphatic solvent thus obtained is diluted with the styrene for the synthesis of HIPS/ABS required and fed directly to the first CSTR reactor and radically polymerized (optionally adding acrylonitrile if ABS is to be produced).

The CSTR reactor used is of the evaporating type as, by exploiting the polymerization heat which is released by the HIPS/ABS synthesis, the low-boiling solvent used in the synthesis of polybutadiene is removed.

U.S. Pat. Nos. 6,143,833 and 6,471,865 describe the synthesis of HIPS with a continuous process starting from butadiene. The polybutadiene is anionically synthesized in reactors of the "plug-flow" type starting from butadiene initiated by organolithium compounds. The solvent used in the synthesis of polybutadiene is an aliphatic solvent with a boiling point lower than 130° C., for example hexane. The patent describes the synthesis of polybutadiene homopolymer or PBu-PS copolymers. The polybutadiene solution in a low-boiling aliphatic solvent thus obtained is diluted with the styrene necessary for the synthesis of the required HIPS and fed to two devolatilizers in series, or in a distillation column to remove the low-boiling solvent and residual butadiene deriving from the polybutadiene synthesis.

The polybutadiene solution in styrene thus obtained is fed to the first CSTR reactor for the synthesis of HIPS required.

U.S. Pat. No. 6,437,043 describes the synthesis of transparent high impact polystyrene with a continuous process starting from butadiene. The polybutadiene is anionically synthesized in reactors of the "plug-flow" type starting from butadiene initiated by organolithium compounds. The solvent used in the synthesis of polybutadiene is an aliphatic solvent with a boiling point lower than 130° C., for example hexane. The polybutadiene synthesized is a random butadiene-styrene (SBR) copolymer. The SBR solution in a low-boiling aliphatic solvent thus obtained is diluted with the styrene necessary for the synthesis of the required HIPS and fed to the solvent exchange section which consist of two devolatilizers or a distillation column. The solution of SBR in styrene thus obtained is then fed to the CSTR reactors necessary for the production of HIPS.

Drawbacks of the above described process types are as follow:

Although the patent EP 334,715 describes the synthesis of polybutadiene in ethylbenzene avoiding the solvent switch area, it has the disadvantage that the subsequent synthesis of the vinyl aromatic (co)polymer has low concentrations of polybutadiene in the HIPS or ABS end-products.

Patent application WO 98/22518 is limited by the fact that, in the case of ABS, the product is incompatible with the low-boiling solvent present at the head of the first CSTR reactor.

In U.S. Pat. Nos. 6,143,833, 6,471,865, 6,437,043, and also patent application WO 98/22518 which describes the use of a continuous process for HIPS or ABS production starting from butadiene, the continuous process represent the main drawback. In this case, in fact, it is impossible to manage off-grade polybutadiene (and/or its block copolymer with styrene) dissolutions and campaign changes as there is no possibility of storing polybutadiene (and/or its block copolymer with styrene) dissolutions which are unsuitable for the synthesis of HIPS (or ABS). Continuous processes, moreover, do not allow the physico-chemical parameter control of the polybutadiene (and/or its block copolymer with styrene) solution obtained from the anionic polymerization of butadiene.

The Applicant has now found an integrated semi-continuous process for the production of high impact vinyl aromatic (co)polymers, by means of anionic/radical polymerization in sequence, starting from butadiene, which over-comes the drawbacks of the known art. In particular, the process comprises:

a. anionic polimerization of butadiene (and, if necessary, styrene in order to obtain block copolymers PS-Pbu) in a batch reactor, in the presence of organolithium compounds and in a low-boiling non-polar solvent;

b1. chain termination of the polybutadiene (or its block copolymer with styrene) at the end of the polymerization, by means of at least one halogen derivative having the general formula:

$$R_3\text{-M-X} \quad (1)$$

wherein X represents a halogen, such as chlorine or bromine, M represents an element of Group IV A, such as carbon or silicon, and R is a $C_1$-$C_8$ alkyl radical, or with carboxylic acids, soluble in the low-boiling non-polar solvent, having the general formula:

$$R^1\text{—COOH} \quad (2)$$

wherein $R^1$ is an alkyl radical with a number of carbon atoms greater than or equal to 6, for example from 6 to 18; and/or b2. first coupling of the polymer chain by means of at least one halogen derivative selected from those having the general formula:

$$R_{4-y}\text{-M-X}_y \quad (3)$$

with X, M and R having the meaning defined above and y being an integer within the range of 2 to 4, extremes included; and/or b3. second coupling by means of at least one aromatic derivative selected from those having the general formula:

$$(R')_n\text{—Ar} \quad (4)$$

wherein R' represents a $C_2$-$C_5$ alkenyl radical, Ar a $C_6$-$C_{18}$ aromatic radical, possibly substituted by non-electron attractor groups, whereas n is an integer ranging from 2 to 10;

c. low-boiling solvent switch to a vinyl aromatic monomer in batch mode;

d. storing the polymer solution of polybutadiene (or its block copolymer with styrene) in a vinyl aromatic monomer, in tanks, according to the polymer grade obtained; and e. feeding the polybutadiene (and/or its block copolymer with styrene) solution in the vinyl aromatic monomer, together with conventional polymerization additives and if necessary a co-monomer, to a continuous-mass polymerization plant, to produce a high impact vinyl aromatic (co)polymer via radical polymerization; and f. recovering the high impact vinyl aromatic (co)polymer from the polymerization plant.

According to the present invention, the above-mentioned termination and coupling reaction of the polymer based on butadiene or butadiene-styrene (b1, b2 and b3), can be used as alternatingly or in sequence. It is therefore envisaged that a termination reaction can follow a coupling reaction, when an equivalent ratio between active lithium and the coupling agent has not been used in the coupling reaction.

If a termination agent is used, having the structure (1) or (2) described above, selected, for example, from $C_1$-$C_4$ alkyl derivatives of silicon chloride, preferably trimethyl chlorosilane, or from organic acids such as hexanoic, heptanoic, octanoic acid (as described, for example, in F. Ciardelli "Macromolecole Scienza e Tecnologia" volume 1, Pacini ed. Pisa, 1982 and references mentioned therein), linear rubbers or elastomers essentially of the polybutadienic type (polymer based on butadiene) or butadiene-styrene diblock copolymer are obtained, whose polymerization degree is univocally determined by the ratio between the moles of butadiene (or butadiene plus styrene) fed into the polymerization reactor and the moles of active lithium present at the beginning of the polymerization. The term active lithium means the total quantity of lithium fed, minus the amount of lithium which reacts with the probable traces of humidity or other scavengers present in the monomer or in the solvent.

If a coupling agent is used, polymers based on butadiene (or butadiene-styrene), linear or branched, can be obtained.

Linear polymers based on butadiene (or butadiene-styrene) are obtained, when a coupling agent of the type $R_2\text{-M-X}_2$ is used, referring to formula (3) of the previous definitions, when y is equal to 2, such as, for example, dimethyl chlorosilane, biphenyl dichlorosilane, or methyl phenyl dichlorosilane. In this case, the polymerization degree of the final polybutadiene will be double with respect to the mole ratio between butadiene (or butadiene plus styrene) and active lithium, previously defined.

Furthermore, the possible addition of a quantity of coupling agent lower than its equivalent will cause a lower coupling degree with the appearance in the molecular weight chromatogram, of a peak corresponding to the non-coupled parent polymer. The term coupling efficacy means the ratio between the areas of the signals obtained by means of gel chromatography analysis, by measuring the area of the peak of the coupled species (ACS) and the sum of the areas corresponding to the coupled (ACS) and non-coupled species (ANCS).

Coupling efficacy=ACS/(ACS+ANCS)*100

Branched butadiene-based (or butadiene-styrene) polymers are obtained, when coupling agents of the type $RMX_3$ and $RMX_4$ are used, referring to formula (3), of the previous definitions, when y is different from 2, such as, for example, trichloromethyl silane, trichlorophenyl silane or silicon tetrachloride. In this case, the number of branches will be equal to three or four, whereas the use of the coupling agent in a quantity lower than the equivalence, causes a decrease in the coupling efficiency.

Branched butadiene-based polymers can also be obtained if polyvinyl aromatic species are used as coupling agents, referring to formula (4), such as, for example, the mixture of divinyl benzene isomers. In this case, the use of suitable ratios allow polymers having a high branching degree, higher than 4 and lower than 10, to be obtained.

According to the present invention, the anionic (co)polymerization of butadiene takes place in the presence of a catalyst based on organic lithium, for example butyl lithium, and in the presence of a non-polar solvent having a boiling point lower than 130° C.; for example between 50 and 130° C., aliphatic or cyclo-aliphatic having from 4 to 10 carbon atoms, preferably from 6 to 9, such as hexane, heptane, octane and relative isomers both pure and in mixture, cyclohexane and cyclopentane. It is also possible to use aromatic solvents such as toluene, ethylbenzene or benzene.

Other catalysts based on organic lithium and other solvents, in addition to the general polymerization conditions of butadiene, can be found, for example, in H. R. Kricheldorf "Handbook of Polymer Synthesis", Dekker, New York, 1991, and references mentioned therein, or in Kirk-Othmer "Encyclopedia of Chemical Technology" fifth edition, Vol. 14, Wiley-Interscience, New York, 2004, and references mentioned therein.

The butadiene can be polymerized alone, to give butadiene homopolymer, or it can be copolymerized in a mixture with other co-monomers, one or more, compatible with the same butadiene, present in a quantity of 1 to 50% by weight with respect to the total. Examples of these monomers are vinyl aromatic monomers, such as styrene, α-methyl styrene, etc.

At the end of the polymerization or (co)polymerization of butadiene, the low-boiling solvent is distilled and switched by a vinyl aromatic monomer in order to maintain a final concentration of the (co)-polymer ranging from 5 to 25% by weight. The replacement of the low-boiling solvent with the vinyl aromatic monomer can be effected by means of devolatilization, as described in U.S. Pat. No. 6,143,833, or by means of a distillation column, as described in U.S. Pat. No. 6,471,865.

In the present invention the solvent switch operation is accomplished by means of a simple distillation consisting of adding the vinyl aromatic monomer in semi-batch mode to the polibutadiene (or its block copolymer with styrene) and low-boiling solvent mixture. The distillates of low and high boiling solvents thus obtained can be treated according to two different operative modes. The first is a continuous separation, after condensation of the mixture of vapours, by means of a distillation column. The second is a non-continuous separation by means of a distillation column installed on the autoclave used in the solvent exchange operation.

The term "vinyl aromatic monomer" as used in the present description and in the claims, essentially refers to a product corresponding to the following general formula:

wherein R is hydrogen or a methyl group, n is zero or an integer between 1 and 5 and Y a halogen such as chlorine or bromine, or an alkyl or alkoxyl radical having from 1 to 4 carbon atoms.

Examples of vinyl aromatic monomers having the above general formula are: styrene, α-methyl styrene, methyl styrene, ethyl styrene, butyl styrene, dimethyl styrene, mono-, di-, tri-, tetra-, and penta-chlorostyrene, bromostyrene, methoxystyrene, acetoxystyrene, etc. Preferred vinyl aromatic monomers are styrene and α-methyl styrene.

During the preparation of the vinyl aromatic (co)polymer, the vinyl aromatic monomers having general formula (I) can be used alone or in a mixture of up to 50% by weight with other co-polymerizable monomers. Examples of these monomers are: (meth)acrylic acid, $C_1$-$C_4$ alkyl esters of (meth)acrylic acid, such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride, etc. Acrylonitrile and methyl methacrylate are the preferred co-polymerizable monomers.

At the end of the switch of the low-boiling solvent with the vinyl aromatic monomer, the new solution is stored in tanks, from which the correct solution is collected in continuous and fed to a continuous-mass plant to produce vinyl aromatic (co)polymers such as HIPS and/or ABS.

The scheme of the semi-continuous plant of the present invention has the advantage, with respect to the continuous plants described in the prior art, of considerably simplifying the off-grade production management and campaign changes in the production of polybutadiene (or its block copolymer with styrene). A "one-step" process also allows the production of HIPS and/or ABS starting from (1) linear polybutadiene, having a solution viscosity lower than 70 cPoise, which would create unacceptable problems of "cold flow" in the solid state, (2) star-shaped polybutadiene with a very high Mooney (higher than 80) and a viscosity in solution higher than 70 cPoise which at present cannot be produced due to technological limitations linked to the finishing plants of the elastomers.

Based on the above, the correct solution of butadiene polymer or copolymer in the vinyl aromatic monomer can be collected in continuous from the relative storage tanks, diluted with a solvent suitable for the polymerization of vinyl aromatic monomers, for example ethylbenzene, modified with possible (co)monomers, acrylonitrile, for example, containing the conventional polymerization agents for producing high impact vinyl aromatic (co)polymers, and fed to the polymerization section. A process for the radical synthesis of high impact vinyl aromatic (co)polymers can be found in European patent EP 400,479.

In the enclosed FIGURE, an illustrative scheme is provided of the integrated process object of the present invention.

Figure 1:
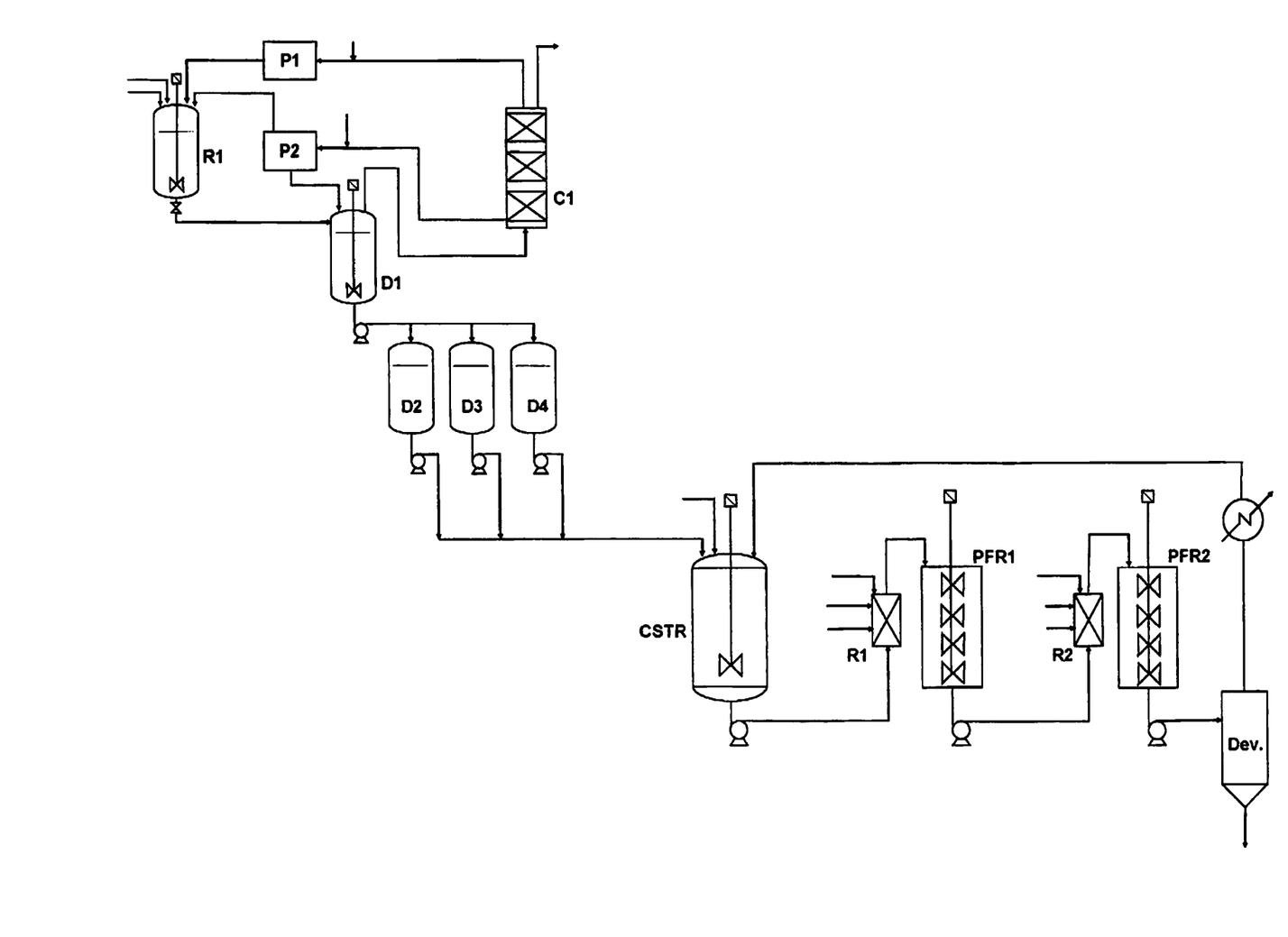

In particular, the scheme comprises a batch-type reactor R1 for the anionic synthesis of polybutadiene (or its block copolymer with styrene), in which a non-polar, low-boiling solvent (hexane), fresh or recycled, butadiene, fresh or recycled, the possible co-monomer of butadiene and the lithium catalyst are fed, in addition to coupling and/or termination additives.

D1 represents an autoclave in which the switch of the solvent with the vinyl aromatic monomer, styrene, for example, takes place.

C1 represents a distillation column to which the mixture of styrene and hexane vapours are fed, which, recovered at the head and tail, respectively, are recycled after purification in P1 and P2.

D2, D3, D4 represent the receiving tanks in which the switched solution of the polymer or (co)polymer of butadiene in styrene, is stored.

CSTR represents a mixing tank to which the solution of (co)polymer of butadiene in styrene and further additives, for example the solvent, paraffin oil, antioxidants etc., are fed.

PFR1 and PFR2 are tubular or plug-flow reactors for the radical polymerization in continuous-mass, arranged in series with respect to the reaction flow, fed with the solution coming from CSTR and with the chemicals, for example, initiator and chain transfer agent, pre-mixed in R1 and R2.

Finally, Dev represents the devolatizer, operating at a temperature ranging from 200 to 250° C. and fed with the final polymeric solution, which allows the recovery of the solvent and non-reacted monomers, recycled to CSTR.

Some comparative and non-limiting examples are provided hereunder for a better understanding of the present invention and for its embodiment.

EXAMPLE 1

Comparative 1.8 kg of polybutadiene INTENE P30 (Polimeri Europa) (Viscosity in solution of 5% in styrene (SM)=40 CPs), 2.8 kg of mineral oil PRIMOL 382 (ESSO), 20 g of antioxidant IRGANOX 245 and 30 g of zinc stearate in 32.53 kg of styrene monomer and 2.8 kg of ethyl benzene, are dissolved in a 60-liter batch-type autoclave, equipped with temperature regulation and a stirring system, heating for 5 hours at 85° C. 6 g of transfer agent n-dodecyl mercaptan (NDM) and g of initiator 1,1-di(terbutyl peroxy)cyclohexane (Tx22E50) are then added.

The solution obtained is fed to a first PFR reactor equipped with a stirrer and a temperature regulation system, with a thermal profile of the reactor increasing from 125 to 145° C., wherein the pre-polymerization is effected with grafting and phase inversion.

The mixture leaving the first reactor is transferred to a second PFR reactor also equipped with a stirrer and a temperature regulation system, with a thermal profile of the reactor increasing from 150 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

EXAMPLE 2

9.9 kg of anhydrous cyclohexane and 1.8 kg of anhydrous butadiene are fed to a 60-liter batch reactor, equipped with a stirrer and a temperature regulation system, under nitrogen atmosphere. The mixture thus obtained is heated to 40° C. and 1.67 g of lithium n-butyl are added.

Once the polymerization reaction is complete, 4.46 g of anhydrous silicon tetrachloride are added under stirring for a further 30 minutes. The polybutadiene characteristics are similar (molecular weight distribution and viscosity in a 5% solution in styrene) to INTENE P30.

The solution obtained is transferred to a second 60-liter batch autoclave equipped with temperature regulation, a stirrer, a vacuum-regulating system and collection system of the condensates. The reactor is thermostat-regulated at 25° C. and is put under vacuum at a pressure of 70 mbar. As soon as the presence of liquid is observed in the condensate collection system, 37.38 kg of styrene are slowly added and the reactor temperature is contemporaneously increased to 66° C. The operation is stopped when 14.75 kg of condensates are collected. The concentration of cyclohexane in the styrene dissolution is lower than 500 ppm. The final solution is stored in a tank for 3 days.

2.8 kg of mineral oil PRIMOL 382 (ESSO), 20 g of antioxidant IRGANOX 245, 30 g of zinc stearate, 2.8 kg of ethyl benzene, 6 g of an NDM transfer agent and 14 g of initiator Tx22E50, are added to the solution obtained.

The solution obtained is fed to a first PFR reactor equipped with a stirrer and a temperature regulation system, with a thermal profile of the reactor increasing from 125 to 145° C., in which the pre-polymerization is effected with grafting and phase inversion.

The mixture leaving the first reactor is transferred to a second PFR reactor also equipped with a stirrer and a temperature regulation system, with a thermal profile of the reactor increasing from 150 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

EXAMPLE 3

9.9 kg of anhydrous toluene and 1.8 kg of anhydrous butadiene are poured into a 40-liter batch reactor equipped with heating and a stirring systems, under inert nitrogen atmosphere. The mixture thus obtained is heated to 40° C. and 1.67 g of n-butyl lithium are added.

Once the polymerization reaction is complete, 4.46 g of anhydrous silicon tetrachloride are added under stirring for an additional thirty minutes. The polybutadiene characteristics are similar (molecular weight distribution, viscosity in 5% styrene solution) to INTENE P30.

The solution obtained is transferred to a second 60-liter batch autoclave, equipped with temperature control and a stirring systems, a vacuum regulation system and collection system of the condensates. The reactor is thermostat-regulated to 38° C. and put under a vacuum of 70 mbar. As soon as the presence of a liquid is observed in the condensate collection system, 49.79 kg of styrene are slowly added and the temperature of the reactor is contemporaneously increased to 74° C. The operation is stopped when 27.16 kg of condensates have been collected. The concentration of toluene in the styrene dissolution is 900 ppm. The final solution is stored in a tank for 3 days.

2.8 kg of mineral oil PRIMOL 382 (ESSO), 20 g of antioxidant IRGANOX 245, 30 g of zinc stearate, 2.8 kg of ethyl benzene, 6 g of NDM transfer agent and 14 g of initiator Tx22E50.

The solution obtained is transferred to a first PFR reactor, equipped with a stirrer and a temperature regulation system, with a thermal profile of the reactor increasing from 125° C. to 145° C., in which the grafting polymerization is effected.

The mixture leaving the first reactor is fed to a secand PFR reactor, also equipped with a stirrer and temperature regulation systems, with a thermal profile of the reactor increasing from 150 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

The characteristics of examples 1-3 are indicated in table 1

TABLE 1

|  |  | Example 1 (Comparative) | Example 2 | Example 3 |
|---|---|---|---|---|
| Rubber phase morphology |  | salami | salami | salami |
| D (4, 3) | μm | 1.33 | 1.35 | 1.32 |
| MFI (200° C.-5 kg) | g/10' | 14.6 | 14.2 | 14.9 |
| Vicat (5 Kg-50° C.) | ° C. | 90.7 | 90.4 | 91.0 |
| TENSILE TEST ISO 527 |  |  |  |  |
| Elastic modulus | MPa | 2080 | 2100 | 2080 |
| Yield strength | MPa | 22.4 | 22.0 | 23.0 |
| Ultimate tensile stress | MPa | 16.4 | 16.7 | 16.0 |
| Strain at break | % | 42.3 | 42.6 | 42.3 |
| FLEXURAL TEST ISO 178 |  |  |  |  |
| Tensile modulus | MPa | 2120 | 2090 | 2150 |
| Maximum stress | MPa | 39.4 | 39.0 | 39.8 |
| IZOD ISO 180 notched. | $KJ/m^2$ | 9.8 | 9.8 | 9.6 |
| CHARPY ISO 179 notched | $KJ/m^2$ | 9.7 | 9.5 | 9.4 |
| Gloss (20°) | % | 40 | 41 | 42 |
| Gloss (60°) | % | 81 | 80 | 82 |

EXAMPLE 4

Comparative 3.4 kg of polybutadiene INTENE P30 (Polimeri Europa) (viscosity in solution at 5% in SM=40 CPs), 60 g of antioxidant IRGANOX 1076 in 21.6 lg of styrene monomer and 7.8 kg of ethyl benzene, are dissolved in a 60-liter batch autoclave, equipped with temperature regulation and a stirring system, heating for 6 hours at 60° C. 14 g of transfer agent ter-decyl mercaptane (TDM), 12 g of initiator Tx22E50 and 7.2 kg of acrylonitrile are then added.

The solution obtained is transferred to a first PFR reactor equipped with a stirrer and a temperature regulation system, with a thermal profile of the reactor increasing from 108 to 115° C., in which the pre-polymerization is effected, with grafting and phase inversion.

The mixture leaving the first reactor is fed to a second PFR reactor, also equipped with a stirrer and temperature regulation systems, with a thermal profile of the reactor increasing from 150 to 165° C.

The resulting mixture is the discharged from the top of the second PFR reactor and passed through a devolatilizer (which operates under vacuum at 235° C.) where the rubber phase is further cross-linked and residual monomers and ethylbenzene are removed from the polymerization mixture. The mould polymer thus obtained is granulated through a cutting machine.

EXAMPLE 5

18.7 kg of anhydrous cyclohexane and 3.4 kg of anhydrous butadiene are fed to a 60-liter reactor equipped with heating and a stirring system, under nitrogen atmosphere. The mixture thus obtained is heated to 40° C. and 3.16 g of n-butyl lithium are added. Once the polymerization reaction has been completed, 8.42 g of anhydrous silicon tetrachloride are added under stirring for a further thirty minutes. The polybutadiene characteristics are similar (molecular weight distribution, viscosity in solution at 5% in styrene) to INTENE P30.

The solution thus obtained is transferred to a second 60-liter batch autoclave, equipped with a temperature regulator and stirring system, a vacuum regulation system and system for collecting the condensates. The reactor is thermostat-regulated at 25° C. and is put under vacuum at a pressure of 70 mbar. As soon as the presence of liquid is observed in the condensate collection system, 32.8 kg of styrene are slowly added and the reactor temperature is contemporaneously increased to 66° C. The operation is stopped when 27.86 kg of condensates are collected. The cyclohexane concentration in the styrene dissolution is lower than 500 ppm. The final solution is stored in a tank for 3 days.

7.8 kg of ethylbenzene, 60 g of antioxidant IRGANOX 1076, 14 g of TDM transfer agent, 12 g of initiator Tx22E50 and 7.2 kg of acrylonitrile are added to the solution obtained.

The solution thus obtained is transferred to a first PFR reactor equipped with a stirrer and a temperature regulation system, with a thermal profile of the reactor increasing from 125 to 145° C., in which the pre-polymerization is effected with grafting and phase inversion.

The mixture leaving the first reactor is transferred to a second PFR reactor also equipped with a stirrer and a temperature regulation system, with a thermal profile of the reactor increasing from 150 to 165° C.

The resulting mixture is the discharged from the top of the second PFR reactor and passed through a devolatilaizer (which operates under vacuum at 235° C.) where the rubber phase is further cross-linked and residual monomers and ethylbenzene are removed from the polymerization mixture. The mould polymer thus obtained is granulated through a cutting machine.

EXAMPLE 6

18.7 kg of anhydrous toluene and 3.4 kg of anhydrous butadiene are fed to a 60-liter reactor equipped with a heating and stirring system, under nitrogen atmosphere. The mixture thus obtained is heated to 40° C. and 3.16 g of n-butyl lithium are added. Once the polymerization reaction has been completed, 8.42 g of anhydrous silicon tetrachloride are added under stirring for a further thirty minutes. The polybutadiene characteristics are similar (molecular weight distribution, viscosity in solution at 5% in styrene) to INTENE P30.

The solution thus obtained is transferred to a second 60-liter batch autoclave, equipped with a temperature regulator and stirring system, a vacuum regulation system and a system for collecting the condensates. The reactor is thermostat-regulated at 38° C. and is put under vacuum at a pressure of 70 mbar. As soon as the presence of liquid is observed in the condensate collection system, 54.2 kg of styrene are slowly added and the reactor temperature is contemporaneously increased to 74° C. The operation is stopped when 51.3 kg of condensates are collected. The toluene concentration in the styrene dissolution is 900 ppm. The final solution is stored in a tank for 3 days.

7.8 kg of ethylbenzene, 60 g of antioxidant IRGANOX 1076, 14 g of TDM transfer agent, 12 g of initiator Tx22E50 and 7.2 kg of acrylonitrile are added to the solution thus obtained.

The solution obtained is transferred to a first PFR reactor equipped with a stirrer and a temperature regulation system, with a thermal profile of the reactor increasing from 125 to 145° C., in which the pre-polymerization is effected with grafting and phase inversion.

The mixture leaving the first reactor is transferred to a second PFR reactor also equipped with a stirrer and temperature regulation system, with a thermal profile of the reactor increasing from 150 to 165° C.

The resulting mixture is the discharged from the top of the second PFR reactor and passed through a devolatilaizer (which operates under vacuum at 235° C.) where the rubber phase is further cross-linked and residual monomers and ethylbenzene are removed from the polymerization mixture. The mould polymer thus obtained is granulated through a cutting machine.

The characteristics of examples 4-6 are indicated in Table 2.

TABLE 2

|  |  | Example 4 (Comparative) | Example 5 | Example 6 |
|---|---|---|---|---|
| Rubber phase morphology |  | salami | salami | salami |
| D (4, 3) | μm | 0.96 | 0.95 | 0.96 |
| MFI (200° C.-5 kg) | g/10' | 4.5 | 4.6 | 4.5 |
| Vicat (5 Kg-50° C.) | ° C. | 104.3 | 104.1 | 104.5 |
| TENSILE TEST ISO 527 |  |  |  |  |
| Elastic modulus | MPa | 2150 | 2180 | 2120 |
| Yield strength | MPa | 41 | 39 | 42 |
| Ultimate tensile stress | MPa | 32.1 | 33.5 | 31.5 |
| Strain at break | % | 34.6 | 34.2 | 34.0 |
| FLEXURAL TEST ISO 178 |  |  |  |  |
| Tensile modulus | MPa | 2080 | 2080 | 2100 |
| Maximum stress | MPa | 66.9 | 67.1 | 65.9 |
| IZOD ISO 180 notched | KJ/m$^2$ | 17.1 | 16.9 | 17.0 |
| CHARPY ISO 179 notched | KJ/m$^2$ | 18.2 | 17.8 | 18.4 |
| Gloss (20°) | % | 44 | 45 | 43 |
| Gloss (60°) | % | 82 | 83 | 82 |

EXAMPLE 7

Comparative 1.8 kg of polybutadiene INTENE 50 (Polimeri Europa) (viscosity in solution at 5% in styrene (SM)=170 CPs), 0.64 kg of mineral oil PRIMOL 382 (ESSO), 16 g of antioxidant IRGANOX 245 and 30 g of zinc stearate in 27.1 kg of styrene monomer and 2.6 kg of ethyl benzene, are dissolved in a 60-liter reactor equipped with a heating and stirring system, heating for 5 hours at 85° C. 5 of transfer agent TDM and 8 g of initiator Tx22E50 are then added.

The solution thus obtained is fed to a first PFR reactor equipped with a stirrer and temperature regulation system, with a thermal profile of the reactor increasing from 125 to 135° C., in which the pre-polymerization is effected with grafting and phase inversion.

The mixture leaving the first reactor is transferred to a second PFR reactor also equipped with a stirrer and temperature regulation system, with a thermal profile of the reactor increasing from 145 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

EXAMPLE 8

8.1 kg of anhydrous cyclohexane and 1.8 kg of anhydrous butadiene are fed to a 60-liter reactor equipped with a heating and stirring system, under nitrogen atmosphere. The mixture obtained is heated to 50° C. and 0.88 g of n-butyl lithium are added. Once the polymerization reaction has been completed, 1.62 g of heptanoic acid are added and the mixture is left under stirring for a further thirty minutes. The polybutadiene characteristics are similar (molecular weight distribution, viscosity in solution at 5% in styrene) to INTENE 50.

The solution obtained is transferred to a second 60-liter batch autoclave, equipped with a temperature regulator and stirring system, a vacuum regulation system and a system for collecting the condensates. The reactor is thermostat-regulated at 25° C. and is put under vacuum at a pressure of 70 mbar. As soon as the presence of liquid is observed in the condensate collection system, 31.1 kg of styrene are slowly added and the reactor temperature is contemporaneously increased to 66° C. The operation is stopped when 12.07 kg of condensates are collected. The cyclohexane concentration in the styrene dissolution is 500 ppm. The final solution is stored in a tank for 3 days.

0.64 kg of mineral oil PRIMOL 382 (ESSO), 16 g of anti-oxidant IRGANOX 245, 30 g. of zinc stearate, 2.6 kg of ethyl benzene, 5 g of TDM transfer agent, and 8 g of initiator Tx22E50 are added to the solution obtained.

The solution obtained is transferred to a first PFR reactor equipped with a stirrer and a temperature regulation system, with a thermal profile of the reactor increasing from 125 to 135° C., in which the pre-polymerization is effected with grafting and phase inversion.

The mixture leaving the first reactor is transferred to a second PFR reactor also equipped with a stirrer and temperature regulation system, with a thermal profile of the reactor increasing from 145 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

EXAMPLE 9

8.1 kg of anhydrous toluene and 1.8 kg of anhydrous butadiene are poured into a 60-liter batch reactor equipped with heating and stirring systems, under nitrogen atmosphere. The mixture obtained is heated to 50° C. and 0.88 g of n-butyl lithium are added.

Once the polymerization reaction has been completed, 1.62 g of heptanoic acid are added under stirring for an additional thirty minutes. The polybutadiene characteristics are similar (molecular weight distribution, viscosity in solution at 5% in styrene) to INTENE 50.

The solution obtained is transferred to a second 60-liter batch autoclave, equipped with temperature control and stirring systems, a vacuum regulation system and a system for collecting the condensates. The reactor is thermostat-regulated to 38° C. and put under vacuum at a pressure of 70 mbar. As soon as the presence of liquid is observed in the condensate collection system, 41.25 kg of styrene are slowly added and the reactor temperature is contemporaneously increased to 74° C. The operation is stopped when 22.22 kg of condensates are collected. The toluene concentration in the styrene dissolution is lower than 500 ppm. The final solution is stored in a tank for 3 days.

0.64 kg of mineral oil PRIMOL 382 (ESSO), 16 g of anti-oxidant IRGANOX 245, 30 g of zinc stearate, 2.6 kg of ethyl benzene, 5 g of TDM transfer agent and 8 g of initiator Tx22E50 are added to the solution obtained.

The solution obtained is transferred to a first PFR reactor, equipped with a stirrer and temperature regulation system, with a thermal profile of the reactor increasing from 125° C. to 135° C., in which the prepolymerization is effected with grafting and phase inversion.

The mixture leaving the first reactor is fed to a second PFR reactor, also equipped with a stirrer and temperature regulation systems, with a thermal profile of the reactor increasing from 145 to 165° C.

The resulting mixture is the discharged from the top of the second PFR reactor and passed through a devolatilaizer (which operates under vacuum at 235° C.) where the rubber phase is further cross-linked and residual monomer and ethylbenzene are removed from the polymerization mixture. The mould polymer thus obtained is granulated through a cutting machine.

The characteristics of the products obtained in the examples 7-9 are indicated in table 3

TABLE 3

| | | Example 7 (Comparative) | Example 8 | Example 9 |
|---|---|---|---|---|
| Rubber phase morphology | | salami | salami | salami |
| D (4, 3) | μm | 3.0 | 2.92 | 2.97 |
| MFI (200° C.-5 kg) | g/10' | 3.9 | 3.6 | 4.2 |
| Vicat (5 Kg-50° C.) | ° C. | 90.0 | 91.2 | 90.5 |
| TENSILE TEST ISO 527 | | | | |
| Elastic modulus | MPa | 1600 | 1570 | 1640 |
| Yield strength | MPa | 20.0 | 17 | 23 |
| Ultimate tensile stress | MPa | 25.0 | 25.4 | 25.3 |
| Strain at break | % | 65.0 | 64.8 | 64.2 |
| FLEXURAL TEST ISO 178 | | | | |
| Tensile modulus | MPa | 1650 | 1650 | 1690 |
| Maximum stress | MPa | 37.0 | 36.1 | 36.8 |
| IZOD ISO 180 notched | KJ/m$^2$ | 9.0 | 8.9 | 9.0 |
| CHARPY ISO 179 notched | KJ/m$^2$ | 9.5 | 9.5 | 9.3 |

EXAMPLE 10

Comparative 3.4 kg of polybutadiene INTENE 50 (Polimeri Europa) (viscosity in solution at 5% in SM=100 CPs), 20 g of antioxidant ANOX 245 PP18 in 22.2 kg of styrene monomer and 7.4 kg of ethyl benzene, are dissolved in a 60-liter batch reactor equipped with temperature regulation and a stirring system, heating for 6 hours at 60° C. 20 g of transfer agent NDM, 12 g of initiator Tx22E50 and 7.2 kg of acrylonitrile are then added.

The solution obtained is fed to a first PFR reactor equipped with a stirrer and a temperature regulation system, with a thermal profile of the reactor increasing from 110 to 120° C., in which the pre-polymerization is effected, with grafting and phase inversion.

The mixture leaving the first reactor is transferred to a second PFR reactor also equipped with a stirrer and a temperature regulation system, with a thermal profile of the reactor increasing from 145 to 155° C.

The resulting mixture is the discharged from the top of the second PFR reactor and passed through a devolatilaizer (which operates under vacuum at 235° C.) where the rubber phase is further cross-linked and residual monomers and ethylbenzene are removed from the polymerization mixture. The mould polymer thus obtained is granulated through a cutting machine.

EXAMPLE 11

14.4 kg of anhydrous cyclohexane and 3.2 kg of anhydrous butadiene are poured into a 60-liter batch reactor equipped with heating and stirring systems, under nitrogen atmosphere. The mixture obtained is heated to 50° C. and 1.70 g of anhydrous n-butyl lithium are added.

Once the polymerization reaction has been completed, 3.12 g of heptanoic acid are added under stirring for an additional thirty minutes. The polybutadiene characteristics are similar (molecular weight distribution, viscosity in solution at 5%, in styrene) to INTENE 50.

The solution obtained is transferred to a second 60-liter batch autoclave, equipped with temperature control, a stirring system, a vacuum regulation system and a system for collecting the condensates. The reactor is thermostat-regulated to 25° C. and put under vacuum at a pressure of 70 mbar. As soon as the presence of liquid in observed in the condensate collection system, 29.25 kg of styrene are slowly added and the reactor temperature is contemporaneously increased to 66° C. The operation is stopped when 21.45 kg of condensates are collected. The cyclohexane concentration in the styrene dissolution is lower than 500 ppm. The final solution is stored in a tank for 3 days.

7.4 kg of ethyl benzene, 20 g of antioxidant ANOX PP18, 20 g of NDM, 12 g of initiator Tx22E50 and 7.2 kg of acrylonitrile are added to the solution obtained.

The solution obtained is transferred to a first PFR reactor, equipped with a stirrer and temperature regulation system, with a thermal profile of the reactor increasing from 110° C. to 120° C., in which the prepolymerization is effected with grafting and phase inversion.

The mixture leaving the first reactor is fed to a second PFR reactor, also equipped with a stirrer and temperature regulation system, with a thermal profile of the reacfor increasing from 145 to 155° C.

The resulting mixture is the discharged from the top of the second PFR reactor and passed through a devolatilaizer (which operates under vacuum at 235° C.) where the rubber phase is further cross-linked and residual monomers and ethylbenzene are removed from the polymerization mixture. The mould polymer thus obtained is granulated through a cutting machine.

EXAMPLE 12

14.4 kg of anhydrous toluene and 3.2 kg of anhydrous butadiene are poured into a 60-liter batch reactor equipped with heating and stirring systems, under nitrogen atmosphere. The mixture obtained is heated to 50° C. and 1.70 g of n-butyl lithium are added.

Once the polymerization reaction has been completed, 3.12 g of heptanoic acid are added under stirring for an additional thirty minutes. The polybutadiene characteristics are similar (molecular weight distribution, viscosity in solution at 5% in styrene) to INTENE 50.

The solution obtained is transferred to a second 60-liter batch autoclave, equipped with temperature control, a stirring system, a vacuum regulation system and a system for collecting the condensates. The reactor is thermostat-regulated to 38° C. and put under vacuum at a pressure of 70 mbar. As soon as the presence of liquid is observed in the condensate collection system, 47.30 kg of styrene are slowly added and the reactor temperature is contemporaneously increased to 66° C. The operation is stopped when 39.50 kg of condensates are collected. The toluene concentration in the styrene dissolution is lower than 500 ppm. The final solution is stored in a tank for 3 days.

7.4 kg of ethyl benzene, 20 g of antioxidant ANOX PP18, 20 g of NDM, 12 g of initiator Tx22E50 and 7.2 kg of acrylonitrile are added to the solution obtained.

The solution obtained is transferred to a first PFR reactor, equipped with a stirrer and a temperature regulation system, with a thermal profile of the reactor increasing from 110° C. to 120° C., in which the prepolymerization is effected with grafting and phase inversion.

The mixture leaving the first reactor is fed to a second PFR reactor, also equipped with a stirrer and temperature regulation system, with a thermal profile of the reactor increasing from 145 to 155° C.

The resulting mixture is the discharged from the top of the second PFR reactor and passed through a devolatilaizer (which operates under vacuum at 235° C.) where the rubber phase is further cross-linked and residual monomers and ethylbenzene are removed from the polymerization mixture. The mould polymer thus obtained is granulated through a cutting machine.

The characteristics of the products obtained in examples 10-12 are indicated in table 4

TABLE 4

|  |  | Example 10 (Comparative) | Example 11 | Example 12 |
|---|---|---|---|---|
| Rubber phase morphology |  | salami | salami | salami |
| D (4, 3) | μm | 8.40 | 8.10 | 8.20 |
| MFI (200° C.-5 kg) | g/10' | 7.6 | 7.6 | 7.4 |
| Vicat (5 Kg-50° C.) | ° C. | 103.3 | 102.8 | 103.3 |
| TENSILE TEST ISO 527 |  |  |  |  |
| Elastic modulus | MPa | 1490 | 1450 | 1470 |
| Yield strength | MPa | 34.5 | 33.9 | 35.0 |
| Ultimate tensile stress | MPa | 33.9 | 34.2 | 33.8 |
| Strain at break | % | 57.9 | 57.2 | 58.1 |
| FLEXURAL TEST ISO 178 |  |  |  |  |
| Tensile modulus | MPa | 1520 | 1480 | 1500 |
| Maximum stress | MPa | 43.6 | 43.8 | 43.1 |
| IZOD ISO 180 notched | KJ/m$^2$ | 8.1 | 7.9 | 8.3 |
| CHARPY ISO 179 notched | KJ/m$^2$ | 8.3 | 8.4 | 8.5 |

The invention claimed is:

1. A semi-continuous integrated process for producing high impact vinyl aromatic (co)polymers, which comprises:
   a. anionic polymerizing at least one monomer of butadiene in a batch reactor, in the presence of an organolithium compound and a non-polar solvent having a boiling point lower than 130° C.;
   b1. effecting a chain termination phase of the polymer based on butadiene, at the end of the polymerization, with at least one halogen derivative having the general formula:

$$R_3\text{-M-X} \quad (1)$$

wherein X represents a halogen, M represents an element of Group IV A, and R is a $C_1$-$C_8$ alkyl radical, or with carboxylic acids, soluble in the non-polar solvent, having the general formula:

$$R^1\text{—COOH} \quad (2)$$

wherein $R^1$ is an alkyl radical with a number of carbon atoms greater than or equal to 6, for example from 6 to 18; and/or
   b2. effecting a first coupling phase of the polymer chain with at least one halogen derivative selected from those having the general formula:

$$R_{4-y}\text{-M-X}_y \quad (3)$$

with X, M and R having the meaning defined above and y being an integer within the range of 2 to 4; and/or
   b3. effecting a second coupling phase with at least one aromatic derivative selected from those having the general formula:

$$(R')_n\text{—Ar} \quad (4)$$

wherein R' represents a $C_2$-$C_5$ alkenyl radical, Ar a $C_6$-$C_{18}$ aromatic radical, optionally substituted by a non-electron attractor group, whereas n is an integer ranging from 2 to 10;
   c. switching in batch the non-polar solvent with a vinyl aromatic monomer to yield a polymer solution based on butadiene;
   d. storing in tanks the polymer solution based on butadiene in a vinyl aromatic monomer, according to the polymer grade obtained; and
   e. feeding the polymer solution based on butadiene in the vinyl aromatic monomer, together with conventional polymerization additives and possibly a co-monomer, to a polymerization reactor, to produce a high impact vinyl aromatic(co)polymer by radical polymerization; and
   f. recovering the high impact vinyl aromatic (co)polymer from the polymerization reactor.

2. The process according to claim 1, wherein a mixture of vapours of the non-polar solvent and vinyl aromatic monomer generated by the solvent switch operation, is separated in continuous, after condensation of the vapour mix, with a distillation column.

3. The process according to claim 1, wherein a vapour mix of the non-polar solvent and vinyl aromatic monomer generated by the solvent switch operation, is separated in batch with a distillation column directly installed on the autoclave used for the solvent switch operation.

4. The process according to claim 1, wherein the non-polar solvent has a boiling point of 50 to 130° C.

5. The process according to claim 1, wherein the non-polar solvent is a aliphatic or cyclo-aliphatic solvent having from 4 to 10 carbon atoms.

6. The process according to claim 1, wherein the non-polar solvent is a aliphatic or cyclo-aliphatic solvent having from 6 to 9 carbon atoms.

7. The process according to claim 1, wherein the non-polar solvent is hexane, heptane, octane, cyclohexane, cyclopentane, toluene, ethylebenzen or benzene.

8. The process according to claim 1, wherein X represents chlorine or bromine.

9. The process according to claim 1, wherein M is carbon or silicon.

10. The process according to claim 1, wherein the butadiene is polymerized as a homopolymer.

11. The process according to claim 1, wherein the butadiene is polymerized as a copolymer.

12. The process according to claim 11, wherein the copolymer comprises butadiene and a vinyl aromatic monomer.

13. The process according to claim 1, wherein the organolithium compound is n-butyl lithium.

\* \* \* \* \*